US006786953B2

United States Patent
Fornof et al.

(10) Patent No.: US 6,786,953 B2
(45) Date of Patent: Sep. 7, 2004

(54) SPIN-ON DESICCANT CARTRIDGE WITH INTEGRAL OIL REMOVAL FILTER

(75) Inventors: William P. Fornof, Girard, PA (US); James P. Koenig, Olmsted Township, OH (US); Leonard Quinn, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 10/205,795

(22) Filed: Jul. 26, 2002

(65) Prior Publication Data

US 2004/0016342 A1 Jan. 29, 2004

(51) Int. Cl.[7] .......................... B01D 53/04; B01D 53/26
(52) U.S. Cl. ........................... 95/122; 96/135; 96/137; 96/138; 96/140; 96/141; 96/144; 96/149; 96/151; 96/153
(58) Field of Search ................. 95/121, 122; 96/134, 96/135, 137–144, 149, 151, 153; 55/486, 527, DIG. 25

(56) References Cited

U.S. PATENT DOCUMENTS

| | | | | | |
|---|---|---|---|---|---|
| 3,680,283 A | * | 8/1972 | Jones, Jr. | .......................... | 96/138 |
| 3,802,160 A | * | 4/1974 | Foltz | .......................... | 95/273 |
| 4,071,337 A | * | 1/1978 | Evans | .......................... | 96/114 |
| 4,097,248 A | * | 6/1978 | Frantz | .......................... | 95/105 |
| 4,111,815 A | * | 9/1978 | Walker et al. | .......................... | 210/487 |
| 4,331,001 A | * | 5/1982 | Jones | .......................... | 62/503 |
| 4,360,433 A | * | 11/1982 | Walker et al. | .......................... | 210/484 |
| 4,544,385 A | * | 10/1985 | Tanaka | .......................... | 96/114 |
| 4,764,189 A | * | 8/1988 | Yanagawa et al. | .......................... | 96/114 |
| 4,816,047 A | * | 3/1989 | Neal | .......................... | 96/137 |
| 4,892,569 A | * | 1/1990 | Kojima | .......................... | 96/113 |
| 4,915,714 A | * | 4/1990 | Teague et al. | .......................... | 55/486 |
| 4,946,485 A | * | 8/1990 | Larsson | .......................... | 96/152 |
| 5,002,593 A | * | 3/1991 | Ichishita et al. | .......................... | 96/137 |
| 5,110,327 A | * | 5/1992 | Smith | .......................... | 96/113 |
| 5,286,282 A | * | 2/1994 | Goodell et al. | .......................... | 96/113 |
| 5,286,283 A | * | 2/1994 | Goodell | .......................... | 96/113 |
| 5,427,609 A | * | 6/1995 | Zoglman et al. | .......................... | 95/98 |
| 5,595,588 A | * | 1/1997 | Blevins | .......................... | 96/108 |
| 5,607,500 A | * | 3/1997 | Shamine et al. | .......................... | 96/144 |
| 5,622,544 A | * | 4/1997 | Shamine et al. | .......................... | 96/134 |
| 5,779,772 A | * | 7/1998 | Unger et al. | .......................... | 96/137 |
| 5,792,245 A | * | 8/1998 | Unger et al. | .......................... | 96/137 |
| 5,851,269 A | * | 12/1998 | Strope | .......................... | 96/144 |
| 6,007,608 A | * | 12/1999 | Johnson | .......................... | 95/287 |
| 6,076,272 A | * | 6/2000 | Conklin et al. | .......................... | 34/80 |

FOREIGN PATENT DOCUMENTS

| | | | |
|---|---|---|---|
| DE | 35 34 161 A1 | * | 4/1987 |
| EP | 0036569 A1 | * | 9/1981 |
| EP | 0234229 A2 | * | 9/1987 |
| EP | 0405073 A2 | * | 1/1991 |
| GB | 2126124 A | * | 3/1984 |

* cited by examiner

Primary Examiner—Robert H. Spitzer
(74) Attorney, Agent, or Firm—Calfee, Halter, & Griswold, LLP

(57) ABSTRACT

An air dryer assembly for removing moisture and oil from a compressed air system includes a desiccant material received in a shell for adsorbing moisture as compressed air passes therethrough. A coalescing element is disposed between an inlet and outlet for removing oil aerosols from the compressed air. A check valve is disposed in parallel with the coalescing element and forces the compressed air to pass through the coalescing element as air flows from the inlet to the outlet. During a purge or reverse flow, compressed air bypasses the coalescing element and removes oil collected in the cartridge through the inlet.

28 Claims, 2 Drawing Sheets

SPIN-ON DESICCANT CARTRIDGE WITH INTEGRAL OIL REMOVAL FILTER

BACKGROUND OF THE INVENTION

This invention relates to a compressed air system, and specifically an air dryer assembly for the compressed air system that removes moisture and oil. The invention finds particular application in a compressor system for vehicles that use pressurized air to selectively control application of vehicle brakes and for other air operated systems associated with the vehicle.

Compressed air systems are used in conventional brake systems, for example, to provide and maintain air under pressure to operate vehicle brakes and auxiliary air systems. Water, particulates, and oil in the compressed air system can lead to component degradation and interfere with optimal operation of the system. Accordingly, an air dryer is usually incorporated into the system to remove water from the compressed air. The air dryer collects and removes air system contaminants in solid, liquid, and vapor form before the contaminants enter the system. The air dryer delivers clean, dry air for braking system components, thereby increasing system life and reducing maintenance costs.

An air brake compressor is typically supplied with oil from the vehicle engine in order to lubricate bearings and other components of the compressor. As will be appreciated, it is difficult to contain the oil in the compressor and oil occasionally becomes entrained in the pressurized air stream exiting the compressor. Modem air dryers use a desiccant material to adsorb water vapor as it passes through an air line from the compressor toward a reservoir or downstream components. The operation and efficiency of the desiccant is adversely affected by oil and thus it is important to minimize contamination of the desiccant with oil by employing a filtering element or oil filter that effectively removes the oil.

In addition, commercially available desiccant-type air dryers provide a structure that allows for replacement of the desiccant material. Periodic replacement of the desiccant material is desirable since, in use, the desiccant material becomes coated with contaminants such as oil, which ultimately reduces its water vapor retention characteristics. Since other components of air dryers have a longer service life, a convenient system for selectively replacing the desiccant material is desired. For example, a spin-on type desiccant air dryer cartridge resembles a conventional motor vehicle spin-on oil filter in the form of a canister. A load plate has a centrally threaded bore such that the entire replaceable air cartridge unit is threaded onto an upstanding boss extending from a mounting surface of the vehicle.

An oil coalescing element removes a majority of aerosols and liquid oil entering a spin-on desiccant cartridge. Unfortunately, known designs have not adequately addressed removal of coalesced oil from the cartridge. For example, purge flow systems direct air flow in a reverse direction or back through the oil coalescing element in an effort to remove entrained oil from the desiccant. However, a poor design can lead to desiccant leakage, to a reduction in the removal of oil from the cartridge, thus leading to a decrease in desiccant life, and ultimately to a negative impact on the performance of the compressed air system.

Thus, a continued need exists in the art to effectively eliminate desiccant contaminant in an air dryer assembly of a compressed air system, to remove the contaminant from the dryer assembly, and to contain the desiccant.

BRIEF SUMMARY OF THE INVENTION

An improved air dryer assembly for removing moisture and oil from a compressed air system is provided that meets the above needs and others in a simple and economical manner.

More particularly, an exemplary embodiment of the invention includes a desiccant material received in a shell for removing moisture as compressed air passes therethrough. An inlet is disposed upstream of the desiccant material, and an outlet disposed downstream thereof. A coalescing element is disposed in the inlet and has a coalescing material for removing at least oil aerosols from the compressed air. A check valve is located in parallel with the coalescing element inlet. The check valve forces compressed air to pass through the coalescing element as air flows from the inlet to the outlet, and allows compressed air to bypass the coalescing element as purge air flows from the outlet to the inlet.

In one embodiment of the present invention, a support member advantageously retains the coalescing element and check valve in the shell.

In another embodiment, a biasing assembly exerts a compacting force on the desiccant material in the shell.

Another aspect of the present invention is a method of removing oil aerosols and liquid oil from the cartridge is also provided. The method includes the steps of directing incoming air through the coalescing element and bypassing the coalescing element during a reverse purge flow.

Further advantages and benefits of the invention will become apparent to those skilled in the art after considering the following description and appended claims in conjunction with the accompanying drawings.

BRIEF DESCRIPTION OF THE DRAWINGS

The invention may take physical form in certain parts and arrangements of parts, a preferred embodiment of which will be described in detail in the following specification.

DETAILED DESCRIPTION OF THE INVENTION

Figure 1:
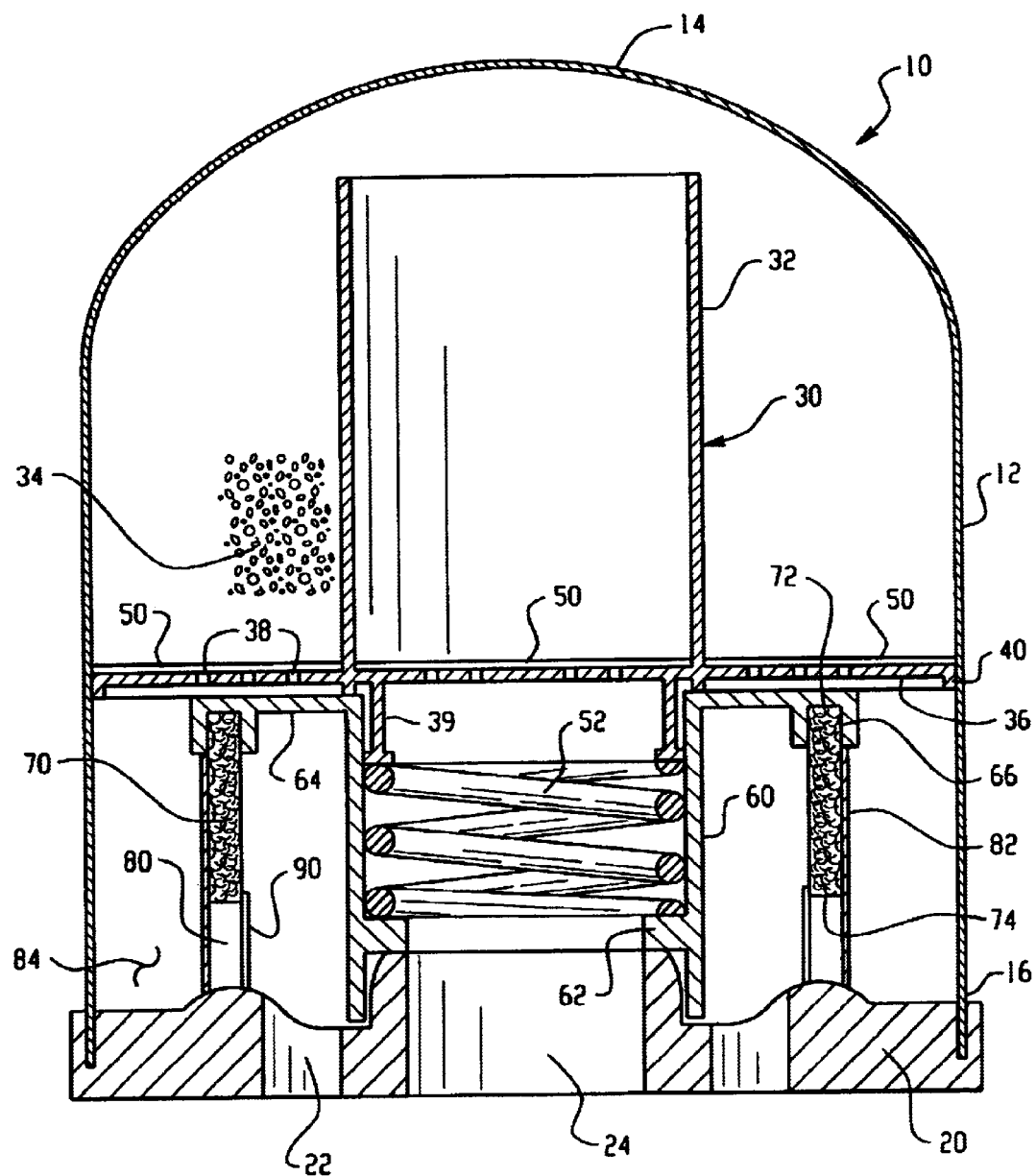
FIG. 1 is a longitudinal cross-sectional view of a spin-on desiccant cartridge in accordance with the present invention.

An air dryer formed in accordance with the present invention is shown in FIG. 1 and is generally designated by reference numeral 10. It will be appreciated that other components of the air dryer assembly are generally well known in the art, for example as, shown and described in U.S. Pat. No. 5,622,544, the disclosure of which are incorporated herein by reference, so that further discussion herein is deemed unnecessary. The spin-on cartridge of the present invention includes a first or outer shell 12 that is preferably cup-shaped. That is, a first or closed end 14 forms a dome while a second or open end 16 is sealingly secured to a load plate 20. The load plate includes an inlet 22 that allows pressurized air from a compressor (not shown) to pass through the cartridge where contaminants and moisture are removed from the air stream. A second passage or outlet 24 is also formed in the load plate 20 and in one embodiment is located at a central location. The outlet 24 communicates with downstream components, such as a storage reservoir (not shown) where clean dry pressurized air is maintained until required by the compressed air system.

A second or inner shell 30 encloses a desiccant material represented by beads 34. The inner shell includes a central wall or cylindrical member portion 32 that extends outwardly from one face of a support wall portion 36. The support wall has a series of openings 38 that are dimensioned to allow air to flow into the desiccant bed. Extending from an opposite face of the support wall portion is a support annulus portion 39. In addition to a downturned flange 40 along the periphery of the support wall portion 36, the annulus portion 39 locates the inner shell 30 within the outer shell 12 of the cartridge assembly 10.

The desiccant material 34 preferably fills the cavity or space between the inner shell 30 and outer shell 12. That is, the desiccant material 34 is received within the inner shell 30 and fills the annular gap between the cylindrical wall portion 32 and the outer shell 12. A perforated material or cloth 50 is air permeable and serves to retain the desiccant material above the support wall portion 36 in a manner that is generally conventional so that further discussion regarding the structure and operation of the cloth 50 and perforated support wall is deemed unnecessary.

A biasing member, such as spring 52, exerts a compacting force on the desiccant bed. In this embodiment, the spring 52 engages the annular wall portion 39 and urges the inner shell 30 toward the closed end 14 of the outer shell 12. An opposite end of the spring 52 engages an inner support member portion 60 along an inner ledge portion 62 that sealingly engages the load plate 20 around the outlet 24. The inner support member portion 60 extends from the load plate 20 and includes a radial wall portion 64 that terminates along its periphery in an axially extending groove 66. The groove 66 retains a first or upper end of a coalescing layer or element 70. The coalescing layer 70 is preferably a microglass fiber or spun glass material that has the consistency of matting or felt. The coalescing layer 70 entraps or coalesces oil or oil aerosols as air passes therethrough from the inlet 22 before entering the desiccant bed. In one embodiment, the upper end 72 of the coalescing element 70 is received in the inner support member 60, while a second or low end 74 is spaced from the load plate 20. This forms a radial passage 80 that is selectively open to airflow as will become more apparent below.

A wicking material 82, such as an open-pored polyester material, envelops or surrounds the coalescing element 70 and passage 80. As shown in FIG. 1, the wicking element 82 extends across the entire gap defined between the annular groove 66 and the inner support member 60 and the load plate 20. The wicking material 82 has a porous construction which allows air to flow through the wicking element 82 and serves to draw oil that coalesces in coalescing element 70 for deposition in a recessed region 84 disposed radially between the wicking element 82 and the outer shell 12.

A one-way flow control device or check valve 90 is associated with the purge outlet passage 80. The check valve precludes airflow from the inlet 22 into the purge outlet. In this manner, all incoming flow must pass through coalescing element 70 before reaching the desiccant bed. On the other hand, the check valve 90 freely opens when a reverse or purge flow is provided. As is known in the art, the reverse or purge flow is periodically passed through the desiccant bed to regenerate the desiccant material and carry adsorbed moisture out of the system, i.e., purge the collected contaminants and moisture. By locating the check valve 90 in parallel arrangement with the coalescing element 70, airflow will travel from the inlet 22 to the outlet 24 through the coalescing element 70, while the purge flow allows airflow to pass through the check valve 90 as it migrates from the outlet 24 to the inlet 22. This flowpath allows the purged air to bypass the coalescing element 70 in its purge path, while picking up coalesced oil that is temporarily collected in the region 84. This oil can migrate through the wicking element 82 and out through the check valve 90, where it communicates with the external environment, atmosphere, or other desired location. In this manner, oil laden air passes through the coalescing element 70 for removal of oil and oil vapor, yet allows purge airflow to remove the coalesced oil without flowing back through the element.

Figure 2:
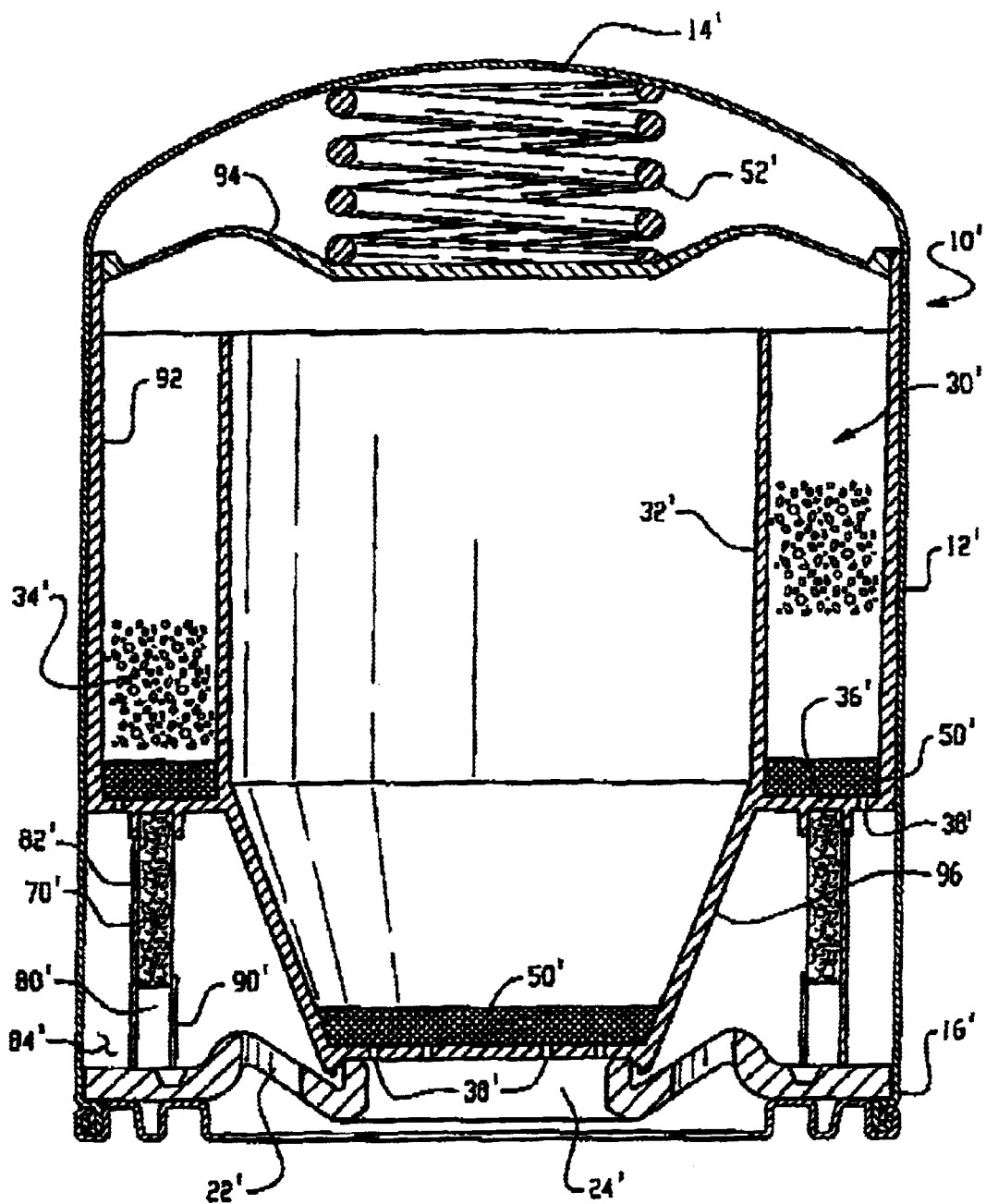
FIG. 2 is a longitudinal cross-sectional view of another preferred embodiment of a spin-on desiccant cartridge.

FIG. 2 is another embodiment of the invention illustrating various changes that can be adopted while incorporating the inventive concepts of the present invention. For purposes of brevity, and ease of understanding, like reference numerals with a primed (') suffix refer to like elements and new numerals refer to new components. Particularly, outer shell 12' receives an inner shell 30' which is slightly modified to incorporate an outer, generally cylindrical wall 92 that is closed at a first or upper end by a compression plate 94. The compression plate 94 allows the biasing spring 52' to be positioned between the closed end 14' of the outer housing and the desiccant bed 34' held within the inner shell 32'.

In addition, the lower wall portion 36' of the inner shell has a conical central portion 96 that maximizes the volume of desiccant material received in the inner shell 32'. It will also be appreciated that the perforated cloth material 50' retains the desiccant beads within the inner shell 32' and prevents the beads from passing through openings 38' in the support wall portion 36'. Here, the support wall portion 36' is defined by two portions, an outer annular portion disposed between walls 32' and 92 and an inner portion dimensioned for receipt at the base of the truncated conical wall 96.

As will be appreciated, the coalescing element 70' is still disposed in parallel relation with the purge outlet 80' and check valve 90' so that air flowing from the inlet 22' to the outlet 24' must proceed through the coalescing element 70'. On the other hand, the reverse, purge flow from the outlet 24' to the inlet 22' is able to bypass the coalescing element 70' and remove oil collected in the region 84' through the check valve 90' from the cartridge.

The invention has been described with reference to illustrative embodiments. Obviously, modifications and alterations will occur to others upon a reading and understanding of the preceding detailed description. For example, the cartridge may not be a spin-on type of cartridge, or may adopt a wide variety of other structural configurations, materials of construction, flow paths therethrough without departing from the spirit and scope of the invention described herein. The invention is to be construed as including all such alterations and modifications insofar as they come within the scope of the appended claims or the equivalents thereof.

What is claimed is:

1. A method of drying and filtering compressed air comprising:

flowing compressed air into an inlet of an air dryer assembly;

passing the compressed air through an oil filter assembly, through a desiccant material and to the outlet of the air dryer assembly;

flowing purge air from the outlet, through the desiccant material, through a means of restricting air flow and to the inlet of the air dryer assembly, wherein said purge air flows through oil collected in an oil collection region and to said inlet without passing through said oil filter.

2. The method of claim 1, wherein the purge air does not pass through the oil filter assembly.

3. The method of claim 2, wherein the means for restricting air flow comprises a check valve disposed in parallel with the oil filter assembly.

4. An air dryer assembly for removing moisture and oil from a compressed air system comprising:

a shell;

a desiccant material received in the shell;

an inlet disposed upstream of the desiccant material;

an outlet disposed downstream of the desiccant material;

a coalescing element disposed in the inlet having a coalescing material for removing at least oil from the compressed air;

a check valve disposed in parallel with the coalescing element in the inlet, the check valve forcing compressed air to pass through the coalescing element as the compressed air flows from the inlet to the outlet and allowing compressed air to bypass the coalescing element as purge air flows from the outlet to the inlet; and an oil collection region located proximate to said check valve, wherein said purge air flow sweeps oil in said region to said inlet bypassing said coalescing element.

5. The air dryer assembly of claim 4 further comprising a support member for retaining the coalescing element and check valve in the shell.

6. The air dryer assembly of claim 4 further comprising a desiccant retaining media disposed downstream of the check valve and coalescing element and upstream of the desiccant material.

7. The air dryer assembly of claim 4 further comprising a load plate for closing an open end of the shell.

8. The air dryer assembly of claim 4 further comprising a biasing assembly for exerting a compacting force on the desiccant material in the shell.

9. The air dryer assembly of claim 8 further comprising a support member for retaining the coalescing element and check valve in the shell, the biasing assembly interposed between the support member and the desiccant material.

10. The air dryer assembly of claim 4 wherein the shell includes an outer shell and an inner shell, the outer shell having a closed end and an open end, the open end operatively engaging a load plate.

11. The air dryer assembly of claim 10 further comprising a support member interposed between the inner shell and the load plate, the support member defining a sealed wall between the inlet and outlet.

12. The air dryer assembly of claim 11 further comprising a biasing spring interposed between the support member and the inner shell for exerting a compacting force on the desiccant material and urging the support member toward sealed engagement with the load plate.

13. The air dryer assembly of claim 4 wherein the coalescing element includes a material that forms oil droplets from aerosols passing therethrough.

14. The air dryer assembly of claim 4 further comprising a wicking element operatively associated with the coalescing element for transferring droplets formed in the coalescing element to a location adjacent the check valve.

15. An air dryer assembly for use in an air brake assembly, the air dryer assembly comprising:

a housing having an internal chamber, and an inlet and an outlet in selective communication with the chamber;

a desiccant material received in the chamber between the inlet and outlet;

an oil filter assembly interposed between the inlet and the desiccant material for removing oil from air passing through the chamber;

a check valve disposed in parallel relation with the oil filter assembly and interposed between the inlet and the desiccant material, the check valve precluding air flow therethrough from the inlet toward the desiccant material and allowing purge air flow therethrough from the desiccant material to the inlet;

an oil collection region located proximate to said check valve, wherein said purge air flow sweeps oil in said region to said inlet bypassing said coalescing element.

16. The air dryer assembly of claim 15 further comprising a support member for retaining the coalescing element and check valve in the housing.

17. The air dryer assembly of claim 15 further comprising a desiccant retaining material disposed downstream of the check valve and coalescing element and upstream of the desiccant material.

18. The air dryer assembly of claim 15 further comprising a load plate for closing an open end of the housing.

19. The air dryer assembly of claim 18 further comprising a biasing assembly for exerting a compacting force on the desiccant material in the housing.

20. The air dryer assembly of claim 19 further comprising a support member for retaining the oil filter assembly and check valve in the housing, the biasing assembly interposed between the support member and the desiccant material.

21. The air dryer assembly of claim 15 wherein the housing includes an outer shell and an inner shell, the outer shell having a closed end and an open end, the open end operatively engaging a load plate.

22. The air dryer assembly of claim 21 further comprising a support member interposed between the inner shell and the load plate, the support member defining a sealed wall between the inlet and outlet.

23. The air dryer assembly of claim 22 further comprising a biasing spring interposed between the support member and the inner shell for exerting a compacting force on the desiccant material and urging the support member toward sealed engagement with the load plate.

24. The air dryer assembly of claim 15 wherein the oil filter assembly includes a material that forms oil droplets from aerosols passing therethrough.

25. The air dryer assembly of claim 15 further comprising a wicking element operatively associated with the oil filter assembly for transferring oil droplets formed in the oil filter assembly to a location adjacent the check valve.

26. An air dryer assembly for removing moisture and oil from a compressed air system comprising:

a housing having an internal chamber, and an inlet and outlet in selective communication with the chamber;

a desiccant material disposed within said housing;

an oil filter assembly interposed between the inlet and the desiccant material for removing oil from air passing through the chamber; and a means for permitting air flow in only one of two directions, such that purge air passes through oil collected in a oil collection region and out the inlet without passing through said oil filter assembly.

27. The air dryer assembly of claim 26 wherein the means for permitting air flow in only one of two directions allows for air to pass from the inlet to the outlet through the oil filter assembly, but does not allow air passing from the outlet to the inlet to pass through the oil filtering assembly.

28. The air dryer assembly of claim 27 wherein the means for permitting air flow in only one or two directions comprises a check valve disposed in parallel with the oil filter assembly.

* * * * *